United States Patent [19]
Cramer

[11] Patent Number: 5,763,973
[45] Date of Patent: Jun. 9, 1998

[54] COMPOSITE BARRIER CAN FOR A MAGNETIC COUPLING

[75] Inventor: Margaret D. Cramer, Indian Trail, N.C.

[73] Assignee: IMO Industries, Inc., Monroe, N.C.

[21] Appl. No.: 739,803

[22] Filed: Oct. 30, 1996

[51] Int. Cl.[6] ............................. H02K 5/00; F04B 17/00
[52] U.S. Cl. ...................... 310/103; 310/85; 417/420; 417/423.12
[58] Field of Search .......................... 310/103, 85, 86, 310/43, 75 D, 301; 417/420, 423.12, 360; 415/122.1, 200; 428/420, 423.11

[56] References Cited

U.S. PATENT DOCUMENTS

| | | | |
|---|---|---|---|
| 3,411,450 | 11/1968 | Clifton | 103/87 |
| 3,591,818 | 7/1971 | Fulton | 310/103 |
| 4,115,040 | 9/1978 | Knorr | 417/420 |
| 4,752,194 | 6/1988 | Wienen et al. | 417/420 |
| 4,773,952 | 9/1988 | Wesley, Jr. | 156/191 |
| 4,854,823 | 8/1989 | Hatting et al. | 417/63 |
| 4,896,064 | 1/1990 | Taiani | 310/104 |
| 4,952,429 | 8/1990 | Schmitz et al. | 428/34.1 |
| 5,165,868 | 11/1992 | Gergets et al. | 417/366 |
| 5,201,642 | 4/1993 | Hinckley | 417/420 |
| 5,308,229 | 5/1994 | DuPuis et al. | 417/368 |
| 5,334,004 | 8/1994 | Lefevre et al. | 417/420 |
| 5,580,216 | 12/1996 | Munsch | 415/122.1 |

*Primary Examiner*—Steven L. Stephan
*Assistant Examiner*—Timothy A. Williams
*Attorney, Agent, or Firm*—Hopgood, Calimafde, Kalil & Judlowe

[57] ABSTRACT

A composite barrier can and method of making same for use with industrial magnetic drive pumps. The barrier can is used to prevent leakage between the inner magnet assembly attached to the pump and the outer magnet assembly attached to the pump drive or motor. The barrier can is a non-metallic, composite barrier can composed of fiber and resin and includes a pole piece. The nonmetallic material and high strength configuration of the composite barrier can permits pump operation at high speeds and pressures with negligible eddy current generation. Using the composite barrier can results in minimizing heat developed in the coupling area and minimizing horsepower required from the motor. A resistance temperature detector is operatively positioned on the exterior of or within the fiber layer of the can such that the sensing portion of the detector is located proximate the closed end of the can. A method of manufacturing the barrier can is also disclosed.

27 Claims, 6 Drawing Sheets

COMPOSITE BARRIER CAN FOR A MAGNETIC COUPLING

BACKGROUND OF THE INVENTION

The present invention is directed to magnetic coupling driven pumps and more particularly to barrier cans which prevent any leakage between the inner magnet attached to the pump, the outer magnet attached to the pump drive or motor and most particularly to a sealless non-metallic composite barrier can for use with magnetic drive pumps.

Pumps having magnetic couplings are typically used in the processing of fluids, such as, for example, fuel oils, lubricating oils, asphalt, crude oil, synthetic fiber dopes and melts, vegetable and animal oils, hydraulic fluids, cutting oils, coolants, jet fuel, molasses and syrup, composite fuels, fire-resistant hydraulic fluids and compatible chemicals and include but are not limited to axial flow multi-rotor positive displacement screw pumps. Axial flow multi-rotor positive displacement screw pumps have precision-ground screws meshing within a close fitting housing to deliver non-pulsating flow quietly and efficiently. The opposed idler rotors act as rotating seals confining the fluid in a secession of closures or stages. The idler rotors are in rolling contact with the central power rotor and are free to float in their respective housing bores on a hydrodynamic oil film. There are no radial bending loads. Axial hydraulic forces on the rotor's set are balanced, eliminating any need for thrust bearing.

Driving sealless rotary screw pumps with magnetic coupling components is known to provide benefits not found in other sealless pump products. The magnetic coupling sealless pumps feature a synchronous drive (motor speed=drive speed) with permanent rare earth magnets on both the inner and outer coupling halves. The magnetic attraction firmly locks the drive rotor together with the motor drive shaft give consistent torque transmission at any speed.

The axial flow path and low inertia rotors, inherent to rotary screw pumps, generally allow operation at higher speeds than other types of rotary pumps. Because of this capability, rotary screw pumps take full horsepower advantage of the torque characteristics of magnetic coupling drives.

During pump operation, the changing magnetic flux produced by the rotating coupling induces voltages within the barrier can material. In an electrically conducting barrier can material, the induced voltages produce localized eddy currents. Power, in the form $i^2R=V^2/R$ where R is resistance, appears as heat on the surface of the cylindrical portion of the conducting can material. The amount of heat generated intensifies with the square of speed, as rotational speed (flux change rate) is increased, thereby limiting the maximum operating speed of the pump.

It is known that excessive heat affects the components of the magnetic coupling adversely. As heat is convected in the coupling area, magnetic field strength is reduced proportionately to the increasing temperature of the permanent magnets. Temperatures above about 150° C. are known to permanently destroy Neodymium-Iron-Boron magnets and temperatures above 250° C. are known to permanently destroy samarium-cobalt magnets.

It is also known that a magnetic coupling which produces excess heat is less efficient than a standard mechanical coupling. A given amount of energy is supplied for operating the pump at a certain rotational speed and that energy is then converted by the motor into work. In a magnetic coupling utilizing a conducting barrier can material, energy lost to excess heat results in less work being accomplished for a given amount of input energy.

It is further known that heat generated in the coupling is convected into the fluid being pumped or pumpage. As a result, the viscosity of the pumpage may be changed thereby. A viscosity change in the pumpage has been known to trigger problems in the pumping system or affect the usefulness of the pumpage. Excessive heat generated by the eddy currents have been known to scald, ignite, or otherwise ruin the pumpage or pumpage additives.

State of the art magnetic drive pumps employing barrier cans made of conductive material are designed to prevent rapid heating by diverting pump flow for continuous flushing of the barrier and inner magnet assembly areas. Lower speeds and viscosities are typically specified for magnetic drive pumps than for mechanically coupled pumps. Oversizing the magnetic drive pump drive motor to compensate for horsepower loss has become a common practice. However, each of these measures detracts from pump efficiency, increases manufacturing costs and, thus, increases the cost of the magnetic drive pumps to the end users.

Heat generated by eddy currents has been reduced by manufacturing barrier cans from nonmagnetic and high electrical volume resistivity steel. However, high levels of heat are still generated in the magnetic couplings having such barrier cans. Some further heat reduction has been achieved in the non-magnetic steel barrier can by producing the can in sections and laminations, as shown in the coupling design described in U.S. Pat. No. 4,896,064.

The cans described therein required the use of gasketing and bonding adhesives to achieve leak proof operation and electrical insulation between laminations. The presence of gaskets and bonding adhesive materials limit the barrier can chemical compatibility with pumped fluids in that, if incompatible, the gaskets and bordering material may contaminate the pumpage.

Since each joint in the barrier can of the 4,896,064 patent is a potential leak path, it would not be acceptable in high pressure and/or high temperature pump environments. A magnetic coupling utilizing the type of barrier can described in the '064 patent must also be designed to accommodate the substantial wall thickness caused by the laminations, gasketing, and bonding.

As is known, thicker can walls increase the gap between the inner and outer magnet assembly assemblies. This gap increase dramatically reduces coupling efficiency and, thus, requires stronger inner and outer magnets to produce the same torque capability as magnetic coupling having smaller gaps between the inner and outer magnet assembly. Thus, the materials, assembly, and system requirements make the barrier can described in the '064 patent a cost prohibitive option.

Although it is presently possible to eliminate heat generation due to eddy currents through the use of non-metallic barrier cans, state of the art metallic barrier cans hold strength and cost advantages over state of the art polymer and ceramic barrier cans. Polymer cans are typically suitable only for low pressure applications and lack dimensional stability during pumpage temperature fluctuations. The presently known ceramic barrier cans must be first molded with a relatively thick wall and then machined on the inner diameter to achieve desirable dimensions and tolerances. It is the post-mold machining of ceramic cans during manufacturing that makes them unacceptable from a cost stand point. Additionally, the thick walls increase the air gap between the magnets resulting in lower pump efficiencies.

3

An additional problem with conventional magnet coupling is that detection of the temperature in the magnetic coupling has proven difficult. Magnetic coupling temperatures are typically acquired by means of a temperature probe placed straight through the pump bracket to the area of the barrier can near the flange. Temperatures in this area are not as high as temperatures in the areas near the closed end of the barrier can. A probe placed in this area typically has failed to detect temperature fluctuations inside the magnetic coupling that could lead to magnetic coupling failure. The result of such conventional probe placement has been a coupling temperature monitoring device which does not accurately detect the magnetic coupling operation temperature near the closed end of the barrier can. More accurate detection of the magnetic coupling temperature in the vicinity of the cans can be achieved by locating the temperature detecting device nearer the closed end of the barrier can. The area near the closed end requires affixing wiring for the device along the exterior of the barrier can and through the flange at the open end of the barrier can. Since this wire path is vulnerable to damage during handling and operation, it has not been considered a viable design.

Thus, there is a need for a magnetic coupling pump which overcomes the deficiencies listed above. Specifically, such a pump should include a magnetic coupling which produces significantly less heat from eddy currents; should significantly reduce energy lost to excessive heat, thereby improving the amount of energy available to accomplish work; should reduce the amount of heat which is convected into the pumpage; should make the magnetic coupling type pumps more competitive with mechanical drive type pumps, thereby reducing, if not eliminating, the requirement to oversize the magnetic drive pump motors in order to compensate for horsepower loss due to the excessive heat losses; should decrease the manufacturing costs of the magnetic coupling; should reduce, if not fully eliminate, gasketing and bonding adhesives and related material which may deteriorate and contaminate the pumpage; should maintain as small a gap as possible between the inner and the outer magnet assemblies; should reduce the size of the inner and outer magnets, such that, smaller inner and outer magnets produce the same torque capability as was produced by the magnetic coupling having conventional cans; should provide for improved sealless operations and should provide for the placement of temperature probe in various positions within a magnetic coupling can in order to more accurately sense or detect the temperature of the magnetic coupling near the closed end thereof.

SUMMARY OF THE INVENTION

One object of the present invention is to at least minimize, if not eliminate, excessive heat develop-ed in the barrier can due to eddy current generation. The invention described in the present application accomplishes this object by replacing the typical metallic barrier can with a novel composite barrier can which generates almost no eddy currents. The composite barrier can of the present application may be retrofitted into the same design envelope as the metallic can with comparable wall thickness as the original metal cans. The composite barrier can of the present application provides strength, deformation resistance, corrosion resistance and cost effectiveness comparable to that of prior metallic barrier cans. The composite barrier can of the present application also incorporates an accurate coupling temperature sensing device.

In one embodiment, the composite magnetic barrier can of the present invention includes a can having an open end and a closed end, the can comprising: a spool piece at the closed end; and an open ended cylinder, operatively connected to the spool piece, the cylinder including a resin coated fiber, the resin coated fiber covering the spool piece to form a closed end.

One method for making a magnetic barrier can of the present invention includes the steps of: providing at least one mandrel; providing at least one spool piece; attaching the at least one spool piece to the at least one mandrel; providing a winding machine having an axis; attaching the at least one spool piece to the winding machine; providing a fiber coated with a resin; weaving the resin coated fiber over the at least one mandrel and about the at least one spool piece to form the closed end of the can; heat curing the can on the at least one mandrel; and removing the at least one can from the at least one mandrel such that the can has about the inner dimensions of about the outer dimensions of the at least one mandrel.

Other objectives and advantages of the present application will become apparent from the following description, the accompanying drawings and the appended claims.

DETAILED DESCRIPTION OF THE INVENTION

Figure 1:
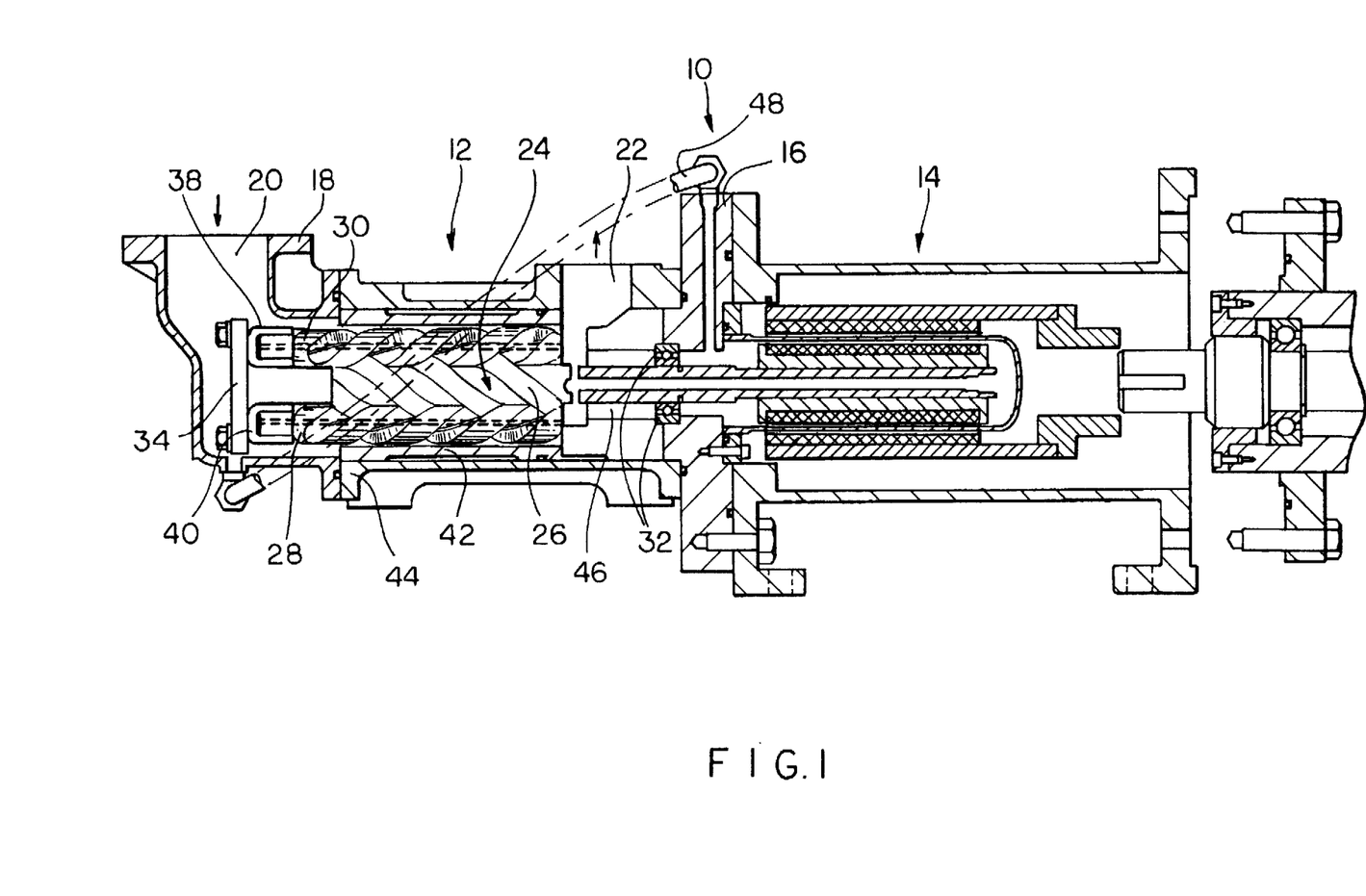
FIG. 1 is a sectional view of a representative magnetic coupling sealless rotary screw pump similar to the pumps useful with the present invention.

A representative magnetic coupling sealless rotary screw pump in which the composite barrier can of the present invention can be utilized is illustrated in FIG. 1. It should be understood that the sealless rotary screw pump is only one possible pump which could benefit from the present invention and that many other pumps could also be used with the present invention, as is known in the art. The sealless rotary screw pump 10 includes a screw portion 12, a magnetic drive coupling 14 and a drive motor (not shown).

The rotary screw pump shown, is similar, but not limited, to those commercially available from IMO Pump Division, P.O. Box 5020, Monroe, N.C. 28111-5020 as models 3D, 6D, 12D and 324. The rotary screw pump 10 comprises a flange 16 for connecting to the magnetic drive coupling 14, a housing 18, having an inlet 20 and an outlet 22 and a rotary screw mechanism 24 operatively positioned inside the housing 18. The rotary screw mechanism 24 comprises a precision ground and hardened power screw 26 and two precision ground, hardened idler rotors 28, 30. A positioning barrier bearing 32, in fluid, is positioned proximate the flange 16. The positioning barrier bearing could also alternatively be a bearing-free hydrostatic type bearing.

The rotary screw pump 10 works in a well known method to move fluid from the inlet 20 to the outlet 22. As shown, a thrustplate 34 is operatively connected to the inlet cover rotor or to extensions of the rotor housing. Balance cups 38, 40 are operatively positioned over the inlet end of the two idler rotors between the idler rotors 28, 30 and the thrust plate 34. A replaceable rotor housing 42 is positioned between the outer casing 44 and the rotary screw pump 24 rotor members 28, 30. Positioned between the bearing 32 and the outlet 22, about the power rotor, is a balance piston 46. A cooling flow return line 48 for returning fluid used to cool the magnetic drive coupling is positioned between the flange and the rotatable inlet 20. In these type drive couplings, magnetic coupling temperatures are typically acquired by means of a temperature probe 70 placed straight through the pump bracket 72 to the area of the barrier can 52 near the flange 74 (see FIG. 2).

Figure 2:
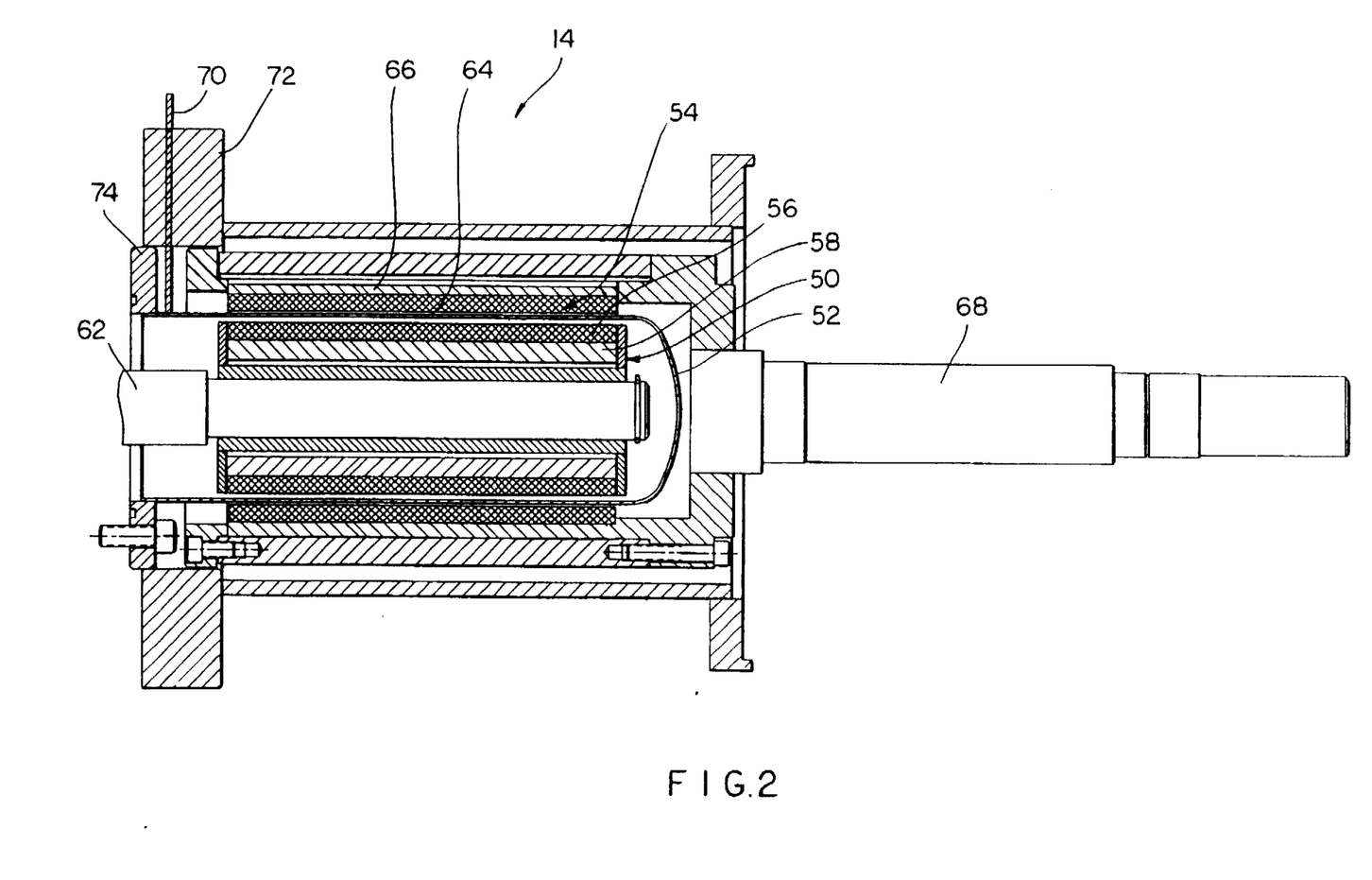
FIG. 2 is a sectional view of a representative magnetic coupling of the pump of FIG. 1.

As shown in FIG. 2, the magnetic coupling 14, comprising three major components, the inner magnet assembly 50, the barrier can 52, and the outer magnet assembly 54, is operatively connected to the pump. The inner magnet assembly 50 comprises permanent magnets 56, preferably neodymium-iron-boron or samarium cobalt magnets, attached to outside diameter of a steel hub 58 which is operatively connected to a shaft member 60. The magnets 56 and hub 58 are covered with a non-magnetic steel sheath (not shown). The inner magnet assembly 50 is connected to the pump drive shaft 62 by means of a key or other mechanical locking device (not shown). The barrier can 52, in prior known couplings, was a thin, typically metal shell that is bolted to the pump so that pumpage is trapped within the can 52 and around the inner magnet assembly 50. By completely entrapping the pumpage, the barrier can 52 became a leak proof pump seal.

The outer magnet assembly 54 consists of permanent magnets 64, preferably neodymium-iron-boron or samarium-cobalt magnets, attached to the inner diameter of a tube shaped steel hub 66. The outer magnet assembly hub is attached to the motor drive shaft 68. The barrier can 52 portion of the pump assembly fits inside the inner diameter of the outer magnet assembly 54. The coupling elements are positioned on the pump assembly such that the inner magnets 56 of assembly 50 and the outer magnets 64 of assembly 54 are aligned for maximum magnetic attraction. Thus, when the motor (not shown) through shaft 68 causes the outer magnets 64 to rotate, the inner magnets 56 and the attached pump shaft 62 rotates at the same speed.

Figures 3, 4:
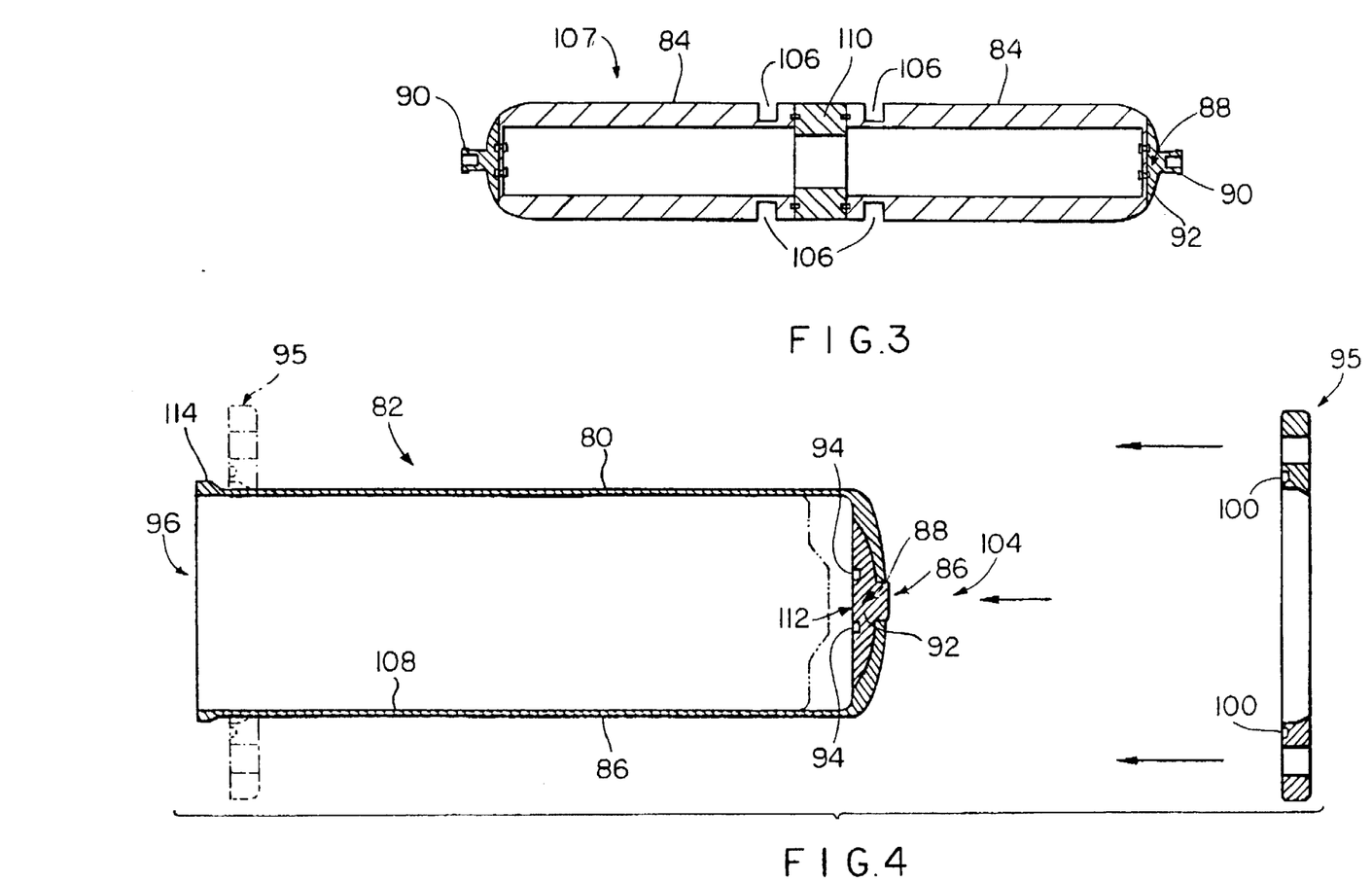
FIG. 3 is a sectional view of the mandrel used to wind the composite can of the present invention.
FIG. 4 is a sectional view of the machined can prior to attachment of the flange.

As shown in FIG. 4, the main body 80 of the barrier can 82 of the present invention is a composite material comprising a fiber, such as, for example graphite fiber, kevlar, fiberglass, etc. and coated with a thermoset resin. One fiber found to be acceptable for use in the present invention is known as T1000GB available from Toray Industries Inc. of Kirkland, Wash. 98033. One multifunctional thermoset resin known to be acceptable for use with the present invention is available from IMO Pump of Monroe, N.C. 28111 under part number PP500DDK. The fiber coated with the resin is normally wound around a mandrel 84 (see FIG. 3), preferably made of carbon steel, which is machined in a conventional process, using a computer controlled filament winding process (not shown). In one preferred embodiment, a fiberless sealant also available from IMO Pump of Monroe, N.C. as part number PP500DDL, is preferably utilized to coat the mandrel 84 prior to the winding of the fiber thereon. The sealant is typically sufficiently thick to provide for the easy removal of the can 80 from the mandrel 84. Presently, the preferred thickness of the sealent is about 0.010 inch.

Since it has been found that fiber orientation and fiber density directly influences the mechanical properties of the finished composite, fiber angles and fiber density are calculated to withstand directional stresses, such as, for example, helical and hoop stresses, as well as tensile stresses and deflection to produce high resistance to deformation in the walls of the composite barrier cans. Resistance to deformation is required to prevent the pressurized can walls 86 from contacting the rotating magnets which can be damaged, if contacts occurred at normal operating speeds. The can walls 86 are preferably about 0.098 to about 0.108 inches thick.

Since the fiber and the resin are non metallic, the production of eddy currents in the composite can 82 of the present invention are negligible during operation of the magnetic coupling. While the eddy currents have not been directly measured, they have been indirectly measured under laboratory conditions. In the laboratory test, the temperature of the fluid exiting the can was compared to the fluid entering the can during operation to determine a "temperature rise". These tests were performed using both the new composite cans and the prior Hastelloy cans (see FIGS. 7 and 8).

Figure 7:
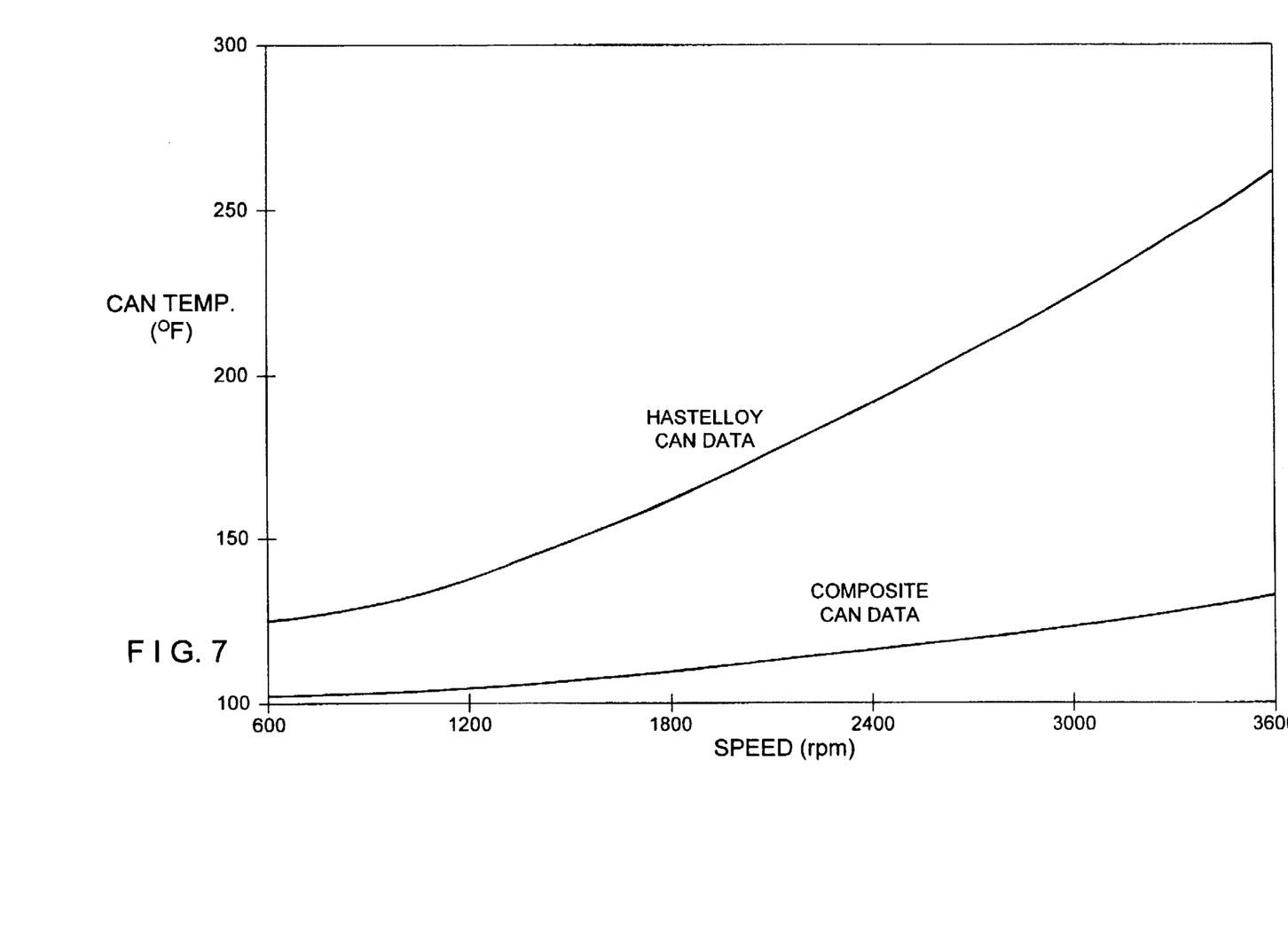
FIG. 7 is a graph of test results comparing the prior Hastelloy can with the new composite can in terms of the measured temperature vs. the measured rotating speed (RPM) under similar conditions.

The results of these tests confirmed that the operation of pumps using the composite can of the present invention generated considerably less heat than was generated using the prior art Hastelloy cans, as clearly shown in FIG. 7. Further, the tests confirmed that, at any given speed, considerably less power was required to drive the coupling containing the composite can than was required to drive the coupling containing the Hastelloy can. The reduction in power requirements of the composite can versus the Hastelloy can was a direct result of the reduced eddy current losses. Regardless of the can used, the pump system liquid temperature would increase due to the fluid temperature rise around the fixture bearings and the viscous shear of the fluid as it passed the fixture. However, the difference in the temperature measured on the Hastelloy can versus the temperature measured on the composite can indicates that a significant amount of additional power was lost in the form of heat due to the Hastelloy material.

Figure 8:
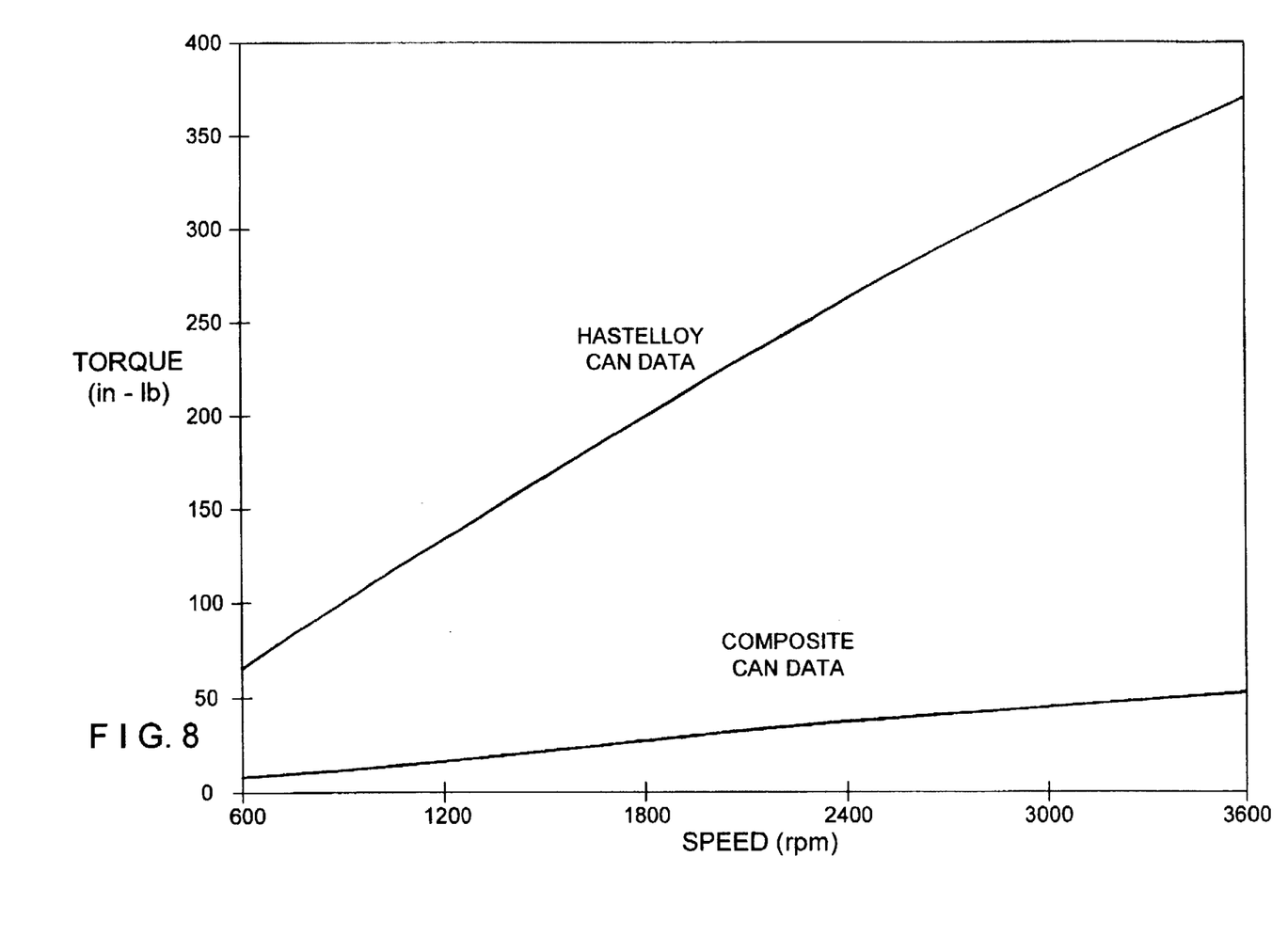
FIG. 8 is a graph of test results comparing the prior Hastelloy can with the new composite cans in terms of the measured torque vs. the measured rotating speed (RPM) under similar conditions.

FIG. 8 shows that a coupling using a composite can of the present invention required significantly less torque to operate at the same operating conditions as a coupling using a Hastelloy can.

The corrosion resistant filament or fiber wound composite material is one important characteristic, among others, to the success of the present invention. Presently, graphite fiber is preferred because, in addition to its known corrosive resistant property, graphite fiber has exceptional strength, stiffness and elongation to failure properties found desirable in the present invention.

On the closed end 86 of the can 82, the fibers and resins are wound into an approximately hemispherical shape which terminates and forms a leakproof seal at a, preferably stainless steel, spool piece 88. The specific design of a representative spool piece 88 is shown in FIGS. 3 and 4. The spool piece 88 comprises a protrusion 90 for connecting the spool piece 88 to a winding machine (not shown). The protrusion 90, as shown in FIG. 4, is severed from the main body 92 of the spool piece 88 after the winding of the resin coated fiber has been accomplished. The spool piece also has conventional means 94, such as, for example threaded bores, for connecting the spool piece 88 to the mandrel 84, as shown in FIG. 3. It should be understood that the structure of the spool piece 88 must be precisely shaped in order to provide the precise alignment necessary to ensure the proper positioning of the resin coated fiber on the mandrel 84 and over the spool piece 88.

After separation of the can 82 from the mandrel 84, the open end 96 of the can 82 is bonded, utilizing a bonding fixture (not shown), to a conventional, preferably stainless steel, flange 95 for connection to a pump (not shown). The bonding fixture aligns the can 82 and positions the flange 95 thereon as shown in phantom in FIG. 4. A high strength, chemically resistant, commercially available two (2) part epoxy adhesive such as, for example, Hysol 934 available from Dexter Hysol Engineering Adhesives of Seabrook, N.H. 03874 has been found to be effective for connecting the flange 95 to the can 82. A conventional O-ring 100 positioned in the flange 95 seals the pumpage (fluid) inside the can 82 to prevent pumpage from escaping to the outer magnetic assembly, 54 and the motor (not shown).

Since eddy currents are induced when magnetic flux lines cut across a conductive material, eddy currents are not developed within the flange 95 and/or the pole piece 88 due to the entire length of the magnet assemblies 50, 54 being located between the spool piece 88 and the flange 95. Therefore, neither the spool piece 88 or the flange 95 is contacted by any magnetic flux lines.

Figure 6:
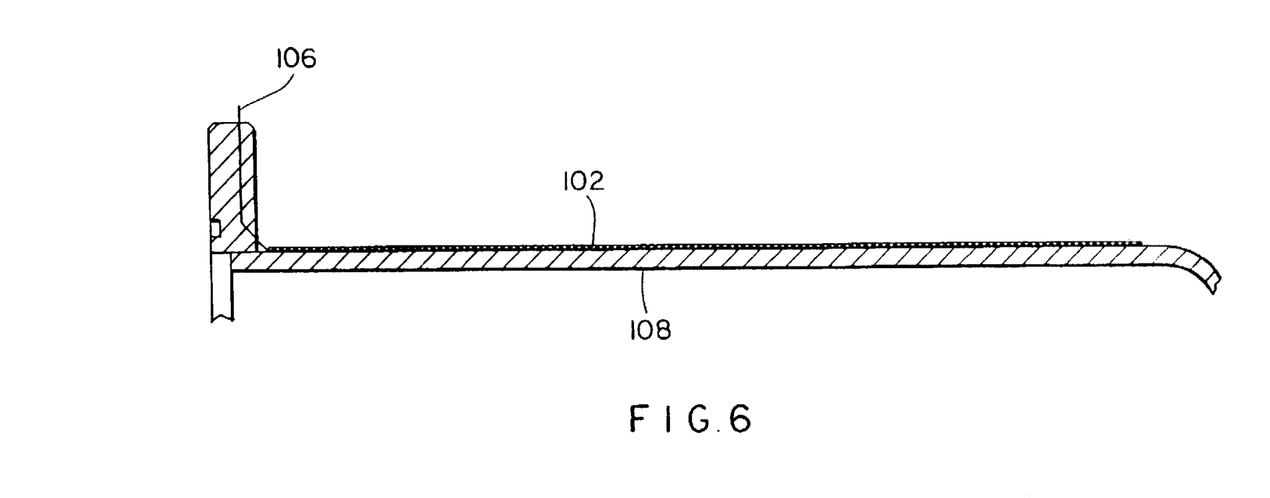
FIG. 6 is a semi schematic sectional view of a coupling temperature detection device bonded to the exterior of the barrier can.

Another aspect of the present invention includes a thin Resistance Temperature Detector (RTD) in the form of a ribbon. This detector can be used to accurately detect the coupling temperature. The Resistance Temperature Detector 102 may be bonded to the exterior of the barrier can 82 in order to provide a pump coupling temperature monitoring device (FIG. 6). The detector 102 is thin enough so that it will not be damaged or interfere with the magnetic coupling operation. Detector 102 may also be incorporated within the composite material during filament winding so that it is completely covered with and protected by the composite material. The resistance temperature detector presently preferably comprises a ribbon about 0.1 inch wide, about 6.5 inches long and paper thin. The ribbon preferably comprises a platinum wire encapsulated in Kapton and includes copper tabs. One example of an acceptable resistance temperature detector ribbon has been obtained from MINCO Products Inc. of Minneapolis, Minn. 55432. The ribbon has been successfully bonded to the can exterior using a commercial two (2) part epoxy such as, for example, Devcon 5 available from Devcon Corporation, Wood Dale Ill. 60191.

It should be understood that the resistance temperature detector ribbon should be sufficiently thin that sufficient clearance is maintained between the outer diameter of the can having the ribbon thereon and the inner diameter of the outer magnets, when the ribbon is positioned on the exterior surface of the can. As long as the gap between the outer diameter of the can and the inner diameter of the outer magnets is sufficient to prevent contact between the outer magnets and the can outer surface, a resistance temperature detector ribbon positioned on the can outer surface has been found to work effectively.

When the resistance temperature detector is positioned inside the composite material, during the winding of the fibers on the mandrel, the resistance temperature detection ribbon is positioned at a time during the winding when the winding is stopped. After the resistance temperature detector has been positioned on the fiber, the winding of additional fiber over the resistance temperature detector is continued until the composite is wound to the required thickness.

Figure 5:
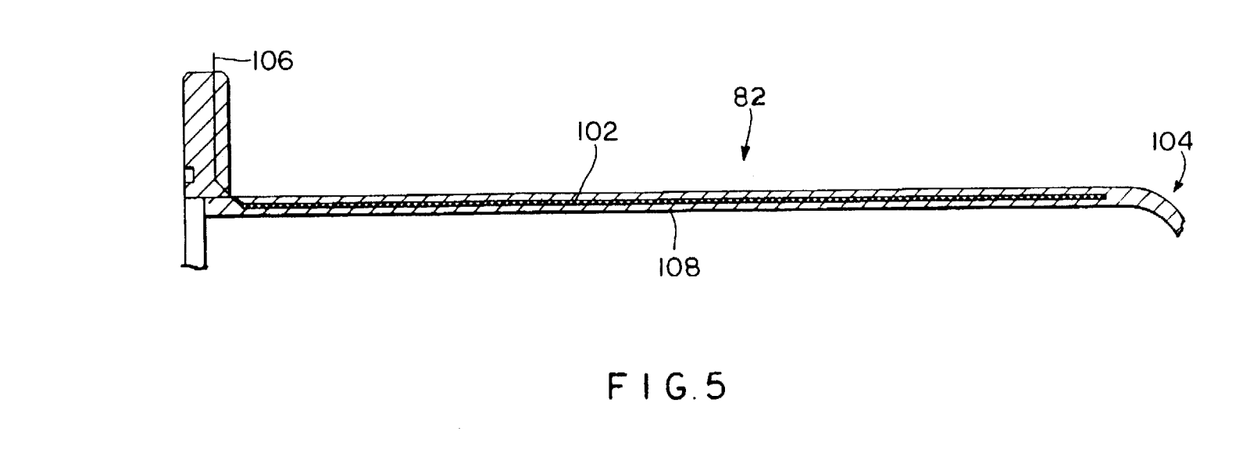
FIG. 5 is a semi schematic sectional view of the coupling temperature detection device contained within the barrier can wall.

In either case, the sensing area of the detector 102 is located within the third (⅓) of the cylindrical portion of the can nearest the closed end 104 of the barrier can 82. The electrical connection to this detector is accessible at the exterior of the can near the stainless steel flange. Conventional temperature indicators (not shown) external to the pump are connected to the detector 102 by wires 106 that travel through the stainless steel flange and coupling bracket of the pump.

Method of Manufacture

During the development of the manufacturing process for the can 82 of the present invention, the initial prototype tooling consisted of a mandrel 84 which could accommodate winding two (2) cans 82 simultaneously. The stainless steel spool pieces 88 were attached to a steel mandrel 84 and also the winding machine axis.

During manufacture, the mandrel 84 is presently preferably first coated with a sealant, presently preferably IMO part number PP500DDL to form a fiberless layer on the mandrel 84. This layer 108 should be sufficient to provide for the easy removal of the finished can 82 from the mandrel 84 at the end of the process. Additionally, the cured sealant layer 108 provides an additional layer of resistance to prevent the pumped fluid from "wicking" an exposed fiber inside the composite. A representative mandrel 84 is shown in FIG. 3. The mandrel 84 is then spun around its axis. Using a CNC program, a winding machine (not shown) is used to weave a fiber, such as, for example, Toray T1000GB graphite fiber, coated with a resin, such as, for example, arcRF-1 resin onto the mandrel in a dense, high strength pattern. The fiber and resin windings covered the spool pieces to form the closed end 104 of the two cans. Extra thickness of the resin coated fiber was wound into the middle portion 106 of the double mandrel 107 to provide an area for the flange connection to the open end 96 of the can 82.

When the winding of the resin coated graphite fiber was completed, the two cans mounted on double mandrel 107 were heat-cured and cooled to room temperature while still in the winding machine. The two cans mounted on the double mandrel 107 were then removed from the winding machine by detaching the spool pieces at the connection points in protrusions 90 such as, for example, threaded connections, to the winding machine axis. The two (2) cans were then separated from each respective mandrel by making two (2) circumferential cuts in the area of extra epoxy filling the cavity 106 where the can contacted the epoxy areas of each mandrel. After the cans are separated, the center piece connection 110 is removed.

Upon removal from each mandrel, the exterior of the two cans had the texture of the fiber weave. The inner diameters of the cylindrical portions of the two cans mirrored the dimension and surface finish of the mandrel outer diameter. The sealant, being an integral part of the inner diameter, provided a smooth, fiberless surface finish. The inner surface 112 of each spool piece 88 was then covered with the sealant to complete the inside fiberless lining or layer 108 of each can.

Next, the tooling protrusion or extension 90 of the pole piece was trimmed off of each can to leave an approximately one sixteenth (1/16) inch protrusion from the closed end. The outer diameter of the thick-wall or open end 96 of the can 82 was machined to form a mechanical stop 114 for mounting the flange 95.

Using a fixture (not shown) to maintain alignment and concentricity, a stainless steel flange 95 was slid from the closed end 104 of each can to the machined stop 114 on the thick-walled open end 96 of the can 82. The flange 95 was then bonded to the stop 114 using a high strength, corrosion resistant epoxy, as shown in FIG. 4. One available epoxy that has proven effective for this application is Hysol 934 available from Dexter Hysol Engineering Adhesives of Seabrook, N.H. 03874.

The composite cans manufactured in accordance with above process have obtained a burst pressure of at least about 6000 psi and has withstood temperature spikes up to about 500° F. and continuous operating temperature up to about 400° F. The composite cans of the present invention have proven to be inert to acids, caustics, chlorinated solvents MDI (methyl di-p-phenyleneisocyanate) and TDI (toluene diisocyanate).

Thus, it should be clear that the pump including the composite can of the present invention have met the objectives of the invention. Specifically, the pump includes a magnetic coupling which produces significantly less heat from eddy currents than prior pumps; has significantly reduced energy lost to excessive heat, thereby improving the amount of energy available to accomplish work; has reduced the amount of heat which is convected into the pumpage; has made the magnetic coupling type pumps more competitive with mechanical drive type pumps, thereby reducing, if not eliminating, the requirement to oversize the magnetic drive pump motors in order to compensate for horsepower loss due to the excessive heat losses; has decreased the manufacturing costs of the magnetic coupling; has reduced, if not fully eliminated, gasketing and bonding adhesives and related material which may deteriorate and contaminate the pumpage; has maintained as small a gap as possible between the inner and the outer magnet assemblies; has reduced the size of the inner and outer magnets, such that, smaller inner and outer magnets produce the same torque capability as was produced by the magnetic coupling having conventional cans; has provided for improved sealless operations and has provided for the placement of temperature probe in various positions within the magnetic coupling barrier can in order to more accurately sense or detect the temperature of the magnetic coupling near the closed end thereof.

Changes and modifications in this specifically described embodiment can be carried out without departing from the scope of the invention which is intended to be limited only by the scope of the appended claims.

What is claimed is:

1. A magnetic barrier can having an open end and a closed end, the can comprising:

a spool piece; and an open ended cylinder having an inner surface and an outer surface, operatively connected to the spool piece, the cylinder including a resin coated fiber, the resin coated fiber covering the spool piece to form the closed end.

2. The can of claim 1 wherein the fiber is selected from the group comprising:

graphite fiber, Kevlar fiber and fiberglass.

3. The can of claim 1 wherein the resin is a multifunctional thermoset resin.

4. The can of claim 1 further comprising:

a thick region, operatively positioned proximate the open end of the cylinder distal from the spool piece, for forming a stop.

5. The can of claim 4 further comprising:

a flange, operation positioned between the opened end and the spool piece, for mounting the can to a magnetic drive pump.

6. The can of claim 5 wherein the flange is positioned proximate the stop and is held in position thereby.

7. The can of claim 1 further comprising:

a fiberless inner layer for preventing contact between the pumpage and the fiber.

8. The can of claim 1 further comprising:

a resistant temperature detector operatively positioned such that the sensing area of the detector is located proximate the closed end of the can.

9. The can of claim 8 wherein the sensing area of the detector is located in the third of the cylindrical portion of the can nearest the closed end of the can.

10. The can of claim 8 wherein the sensing area of the detector is located on the outer surface of the can.

11. The can of claim 8 wherein the sensing area of the detector is embedded within the plurality of layers of resin coated fiber.

12. A magnetic coupling driven pump comprising:

a housing having an inlet and an outlet;

a pumping mechanism operatively positioned inside the housing;

a magnetic drive coupling, operatively positioned proximal the pumping mechanism, for operatively connecting the pumping mechanism to a drive mechanism; and a barrier can having an open end and a closed end operatively positioned within the magnetic drive coupling, the magnetic barrier can comprising:

a spool piece; and an open ended cylinder having an inner surface and an outer surface, operatively connected to the spool piece, the cylinder including a resin coated fiber, the resin coated fiber covering the spool piece to form the closed end.

13. The pump of claim 12 wherein the fiber for the magnetic barrier can is selected from the group comprising:

graphite fiber, Kevlar fiber and fiberglass.

14. The pump of claim 12 wherein the resin is a multifunctional thermoset resin.

15. The pump of claim 12 wherein the magnetic barrier can further comprises:

a thick region, operatively positioned proximate the open end of the cylinder distal from the spool piece, for forming a stop.

16. The pump of claim 15 wherein the flange is positioned proximate the stop and is held in position thereby.

17. The pump of claim 12 wherein the magnetic barrier can further comprises:

a fiberless inner layer for preventing contact between pumpage and the fiber.

18. The pump of claim 12 wherein the magnetic barrier can further comprises:

a resistant temperature detector operatively positioned such that the sensing area of the detector is located proximate the closed end of the magnetic barrier can.

19. The pump of claim 18 wherein the sensing area of the detector is located in the third of the cylindrical portion of the can nearest the closed end of the magnetic barrier can.

20. The pump of claim 18 wherein the sensing area of the detector is located on the outer surface of the magnetic barrier can.

21. The pump of claim 18 wherein the sensing area of the detector is embedded within the plurality of layers of resin coated fiber.

22. The pump of claim 12 wherein the pumping mechanism comprises:

a rotary screw mechanism.

23. The pump of claim 12 wherein the pumping mechanism comprises:

an impeller.

24. The pump of claim 12 wherein the pumping mechanism comprises:

gears.

25. (Amended) The pump of claim 22 wherein the rotary screw mechanism further comprises:

a power screw operatively connected to the drive mechanism external to the pump; and two idler rotors.

26. The pump of claim 12 further comprising:

a flange, operatively connected to the magnetic coupling, for operatively connecting the magnetic drive coupling to the pumping mechanism.

27. The pump of claim 12 wherein the magnetic coupling further comprises:

an inner magnet assembly, operatively positioned inside the magnetic barrier can and operatively connected to the pumping mechanism; and an outer magnet assembly operatively positioned outside the magnetic barrier can and operatively connected to the drive mechanism.

* * * * *